United States Patent [19]

Boudault

[11] Patent Number: 4,573,165
[45] Date of Patent: Feb. 25, 1986

[54] TRANSMISSION CIRCUIT FOR MODEMS EMPLOYING FREQUENCY SHIFT KEYING

[75] Inventor: Robert Boudault, Limours, France

[73] Assignee: 501 Telecommunications Radioelectriques et Telephoniques T.R.T., Paris, France

[21] Appl. No.: 507,823

[22] Filed: Jun. 24, 1983

[30] Foreign Application Priority Data

Jun. 25, 1982 [FR] France ............................ 82 11203

[51] Int. Cl.$^4$ ......................... H03C 3/02; H03K 7/06
[52] U.S. Cl. ........................................ 375/9; 375/65; 331/179; 332/9 R; 332/16 R
[58] Field of Search .................. 375/9, 62, 65; 178/69 R, 69 M, 63 E; 332/9 R, 10, 16 R, 16 T; 328/35, 181, 185; 331/179

[56] References Cited

U.S. PATENT DOCUMENTS

| | | | |
|---|---|---|---|
| 3,659,031 | 4/1972 | Adachi | 331/179 |
| 3,659,048 | 4/1972 | Zuerblis et al. | 331/179 |
| 3,878,484 | 4/1975 | Hekimian | 328/181 |
| 4,232,862 | 4/1982 | Boudault et al. | 331/179 |
| 4,320,521 | 3/1982 | Balakrishnan et al. | 375/36 |

*Primary Examiner*—Benedict V. Safourek
*Attorney, Agent, or Firm*—Thomas A. Briody; William J. Streeter; Leroy Eason

[57] ABSTRACT

An FSK modem transmission circuit which includes a modulator adapted to selectably produce pairs of low and high frequency carrier waves in any combination of up to five frequencies specified in international and U.S. standards. The modulator circuit includes a regenerative feedback loop which generates a triangular carrier wave at a frequency determined by the resistance of a resistor network having five different settings selected by switches therein controlled by the data signal and by logic control signals. The transmission circuit also includes a filter which modifies the waveform of the transmitted carrier wave to suppress odd harmonics thereof, thereby isolating the carrier wave from the modem receiver circuit which is coupled to the transmission circuit by a hybrid coupler.

5 Claims, 3 Drawing Figures

TRANSMISSION CIRCUIT FOR MODEMS EMPLOYING FREQUENCY SHIFT KEYING

The invention relates to a transmission circuit suitable for modems employing frequency shift keying and being connectable to a transmission path in which data transmission can be effected by a couple of low frequencies or a couple of high frequencies, this transmission circuit comprising a modulator and a filter circuit, the modulator being constituted by an integrating circuit whose output is connected to the input of a bistable circuit having trigger hysteresis, the output of this bistable circuit being connected to the input of the integrated circuit through a resistor network to be controlled by the data signal to be transmitted to modify the current applied to the integrating circuit in such a way that the latter produces a triangular signal whose frequency depends on the data signal.

Modems employing the above-described transmission circuit satisfy, for example, the CCITT Recommendation V.23 which recommends for a low-rate transmission up to 75 Baud, the two low frequencies of 390 Hz and 450 Hz and, for a high-rate transmission up to 1200 Baud the two high frequencies of 1300 Hz and 2100 Hz. In addition, this recommendation recommends for a transmission up to 600 Baud the two high frequencies of 1700 Hz and 1300 Hz. In other standards such as the US Bell 203 standard, the low-rate and high-rate transmissions are effected with the aid of low and high frequencies which are rather near to the frequencies prescribed by the CCITT. At the two ends of a link employing these modems, a modem transmitting data at a low rate and receiving data at a high rate must be employed at one end and at the other end an inverse modem transmitting data at a high rate and receiving data at a low rate.

For considerations of manufacturing cost and maintenance cost it is of course desirable that only one type of modem is produced, which can be easily adjusted in the factory to a frequency standard and can be controlled with logic means at the site where it is installed to realize a modem at one or at the other end. As regards the transmission circuit of this single type of modem, its modulator must be designed such that the adjustment in the factory makes it possible to produce, with the high precision required, all the possible frequencies of a standard and that a control by logic signals renders it possible to employ it for the supply of either low frequencies or high frequencies or an additional frequency. On the other hand, the filter circuit of the transmission circuit must be designed such that the signals transmitted towards the remote modem do not disturb the local receiving circuit through the unwanted path created by inevitable imperfections of the two-wire four-wire coupler (hybrid) which couples the modem to a two-wire transmission path. Finally, the transmission circuit must be designed such that it permits of a local test of the modem which is performed looping the transmitted to the receiver to this modem, it being necessary for the elements of this loop to include the maximum number of circuits employed in normal operation.

The modulator described above for supplying triangular signals is of the type described in U.S. Pat. No. 4,323,862 issued Apr. 6, 1982. However, this known modulator is only designed for supplying two low frequencies or two high frequencies, separated by the same frequency shift, which is not the case for the modulator of the invention for which the frequency shifts are different for the couple of low frequencies and the couple of high frequencies. In addition, the resistor network and its control provided in the known modulator do not permit of independently adjusting the possible transmission frequencies in the factory and, in order to obtain the precision of the required frequency, this would lead to either a costly adjustment in the field or the use of precision components, which are also expensive.

To realize the transmission filter circuit of the single type of modem under consideration, a possible solution consists in the use of a band-limiting filter which is switchable for transmitting either the signal transmitted with the two low frequencies or the signal transmitted with the two high frequencies on a band of a limited width. Such a filter must be capable of being switched to realize either the one or the other of the two modems at the ends of a link, or in the event of a local test of the modem. But such a switchable filter which may, for example, be of the type described in U.S. Pat. No. 4,393,508, issued July 12, 1983, for a local modem test system, is also rather costly because of the larger number of components used and because of the necessary adjustments in the factory.

It is an object of the present invention to avoid all these disadvantages by providing a transmission circuit which is simple to realize, comprises a switchable modulator which is adaptable to different standards and comprises a filter circuit which can be used without change-over for all possible transmission frequencies.

According to the invention, in a transmission circuit for modems employing frequency shift keying, the resistor network included in the modulator is formed by two parallel branches each comprising the series arrangement of a first resistor connected to the bistable circuit and a second resistor, the first resistors of the two branches being short-circuitable by a couple of first analog switches, while one of the branches further comprises a second analog switch in series with the second resistor, the first switches being together controlled by the data signal for supplying, depending on the position of the second switch, either the couple of low frequencies or the couple of high frequencies, the filter circuit comprising a harmonics suppressing circuit which is arranged for modifying the shape of the triangular signal supplied by the modulator so as to suppress the unwanted harmonics of the two low frequencies which are located in the frequency band of the local receiving circuit for the two high frequencies.

In the transmission circuit according to the invention, the harmonics suppressing circuit provided in the filter circuit may advantageously be a wave-shaping circuit having diodes and being arranged for modifying the shape of the triangular signal supplied by the modulator so as to obtain a signal having a polygonal shape which does not contain the unwanted harmonics of the low frequencies.

In the case of, for example, the CCITT standard, the unwanted harmonics to be cancelled are the third and fifth harmonics of the low frequencies of 390 and 450 Hz which are located in the receiving band of the local receiver. An additional advantage is the suppression without additional cost of the third and fifth harmonics of the high frequencies of 1300 (or 1700) and 2100 Hz which are located outside the band of the transmission channel, which facilitates the construction of the low-pass filter for adaptation to the transmission channel.

The following description, given by way of example with reference to the accompanying drawings, will make it better understood how the invention can be put into effect.

FIG. 2 is a table illustrating how the resistor network of the modulator can be adjusted and controlled for adapting the transmission circuit to a standard and to one type of modem;

Figure 1:
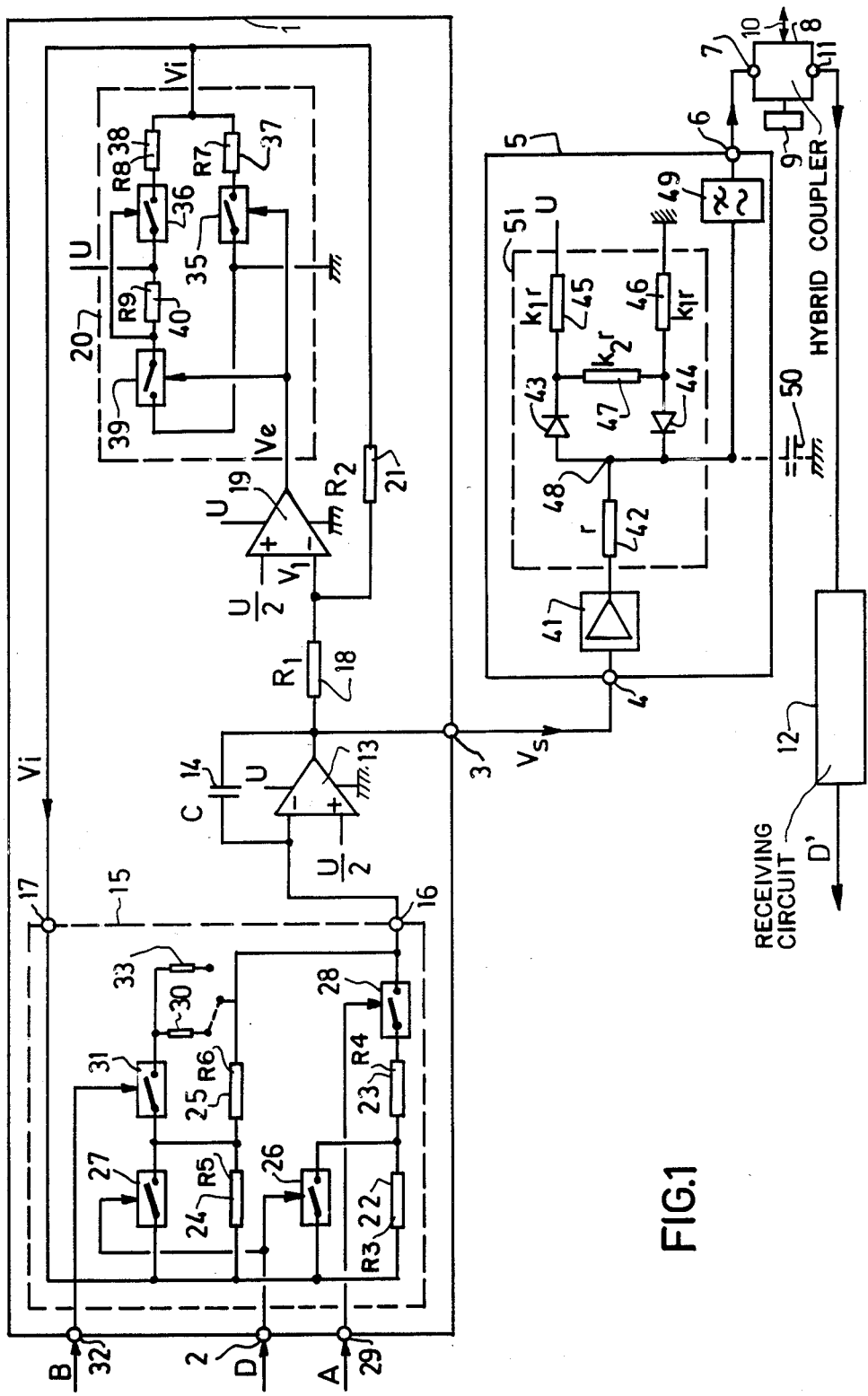
FIG. 1 shows the circuit diagram of the transmission circuit according to the invention.

The transmission circuit according to the invention shown in FIG. 1 is suitable for use with modems employing frequency shift keying. It comprises a modulator 1 which receives at its terminal 2 a data signal D to be transmitted and whose output 3 is connected to the input 4 of a filter circuit 5. For a proper understanding of the following part of the description it is assumed that this transmission circuit is utilized in a modem connected to a two-wire transmission line. In that case, the output 6 of the filter circuit 5 is connected in this modem to the transmit access 7 of a two-wire four-wire coupler (hydrid) 8 comprising a balancing impedance 9. The line access of this coupler is connected to a transmission line 10. Finally, the receive access 11 of the coupler is connected to the input of a receiving circuit 12 which has for its object to recover the data signal D' transmitted by means of a modem (not shown) connected to the other end of the transmission line 10.

To satisfy, for example, the standard defined in the CCITT Recommendation V.23, the modems at one end must transmit data with the aid of the low frequencies of 390 Hz and 450 Hz and receive data transmitted with the aid of the high frequencies of 1300 Hz and 2100 Hz (or 1700 Hz and 2100 Hz), while the modems at the other end must transmit data with the aid of the said high frequencies and receive data transmitted with the aid of the said low frequencies.

To satisfy an other standard, such as the US Bell 203 standard, the low frequencies to be employed are 357 Hz and 487 Hz, the high frequencies are 1200 Hz and 1300 Hz, while an additional frequency of 900 Hz must be provided for signalling purposes.

The precision of the frequency required in these two standards must be better than 0.5%.

The present invention has for its object to provide a transmitting circuit of an unique type having a modulator 1 by means of which it is possible, by preadjustment in the factory, to provide modems for the two standards and, by means of logic control signals, to generate any required frequency from the five frequencies employed in each standard, and comprising a filter circuit 5 which prevents the transmitted signals from reaching, with an annoying level, the local receiving circuit 12 through the unintentional path between the terminals 7 and 11 of the hybrid coupler 8.

The modulator 1 employed in the transmission circuit according to the invention comprises an integrating circuit formed by an operational amplifier 13 and a capacitor 14 having a capacitance C connected between the inverting input and the output of the amplifier 13, and a resistor network 15, a terminal 16 of which is connected to the inverting input of the amplifier 13 and whose other terminal 17 receives a two-level voltage $V_i$ which is formed in a way to be explained hereinafter. The resistance value R of the network 15 between its terminals 16 and 17 must, more specifically, be controlled by the data signal D applied to the terminal 2 of the modulator. The operational amplifier 13 is fed from a voltage supply source U one of the terminals of which is at the 0 V ground potential. The non-inverting input of the amplifier 13 is brought to the voltage U/2. Its output signal constitutes the output signal $V_s$ of the modulator 1.

The output of the operational amplifier 13 is connected through a resistor 18 of value $R_1$ to the inverting input of an operational amplifier 19 which serves as a comparator. This comparator 19 is also fed from the voltage source U and its non-inverting input is brought to the voltage U/2. The output of the comparator 19 is connected to a circuit 20, which is fed from the voltage source U and functions as a logic inverter. The output of the inverter 20 is connected to the terminal 17 of the resistor network 15 and also to a terminal of a resistor 21 of value $R_2$, whose other terminal is connected to the inverting input of the comparator circuit 19.

This arrangement of the comparator 19 with the inverter 20 provides a bistable circuit having trigger hysteresis, having as its input signal the voltage $V_1$ applied to the inverting input of the comparator 19 and as its output signal the two level voltage $V_i$ supplied by the inverter 20. Actually, the output voltage $V_i$ changes suddenly from the value 0 to the value U when the input voltage $V_1$ becomes just higher than the voltage U/2 and changes suddenly from the value U to the value 0 when the input voltage $V_1$ becomes just lower than the voltage U/2. A hysteresis similar to the hysteresis of an arrangement commonly known as a Schmidt trigger, is produced as a result of the fact that when the output voltage $V_i$ changes from 0 to U, the input voltage $V_1$ suddenly increases from the value U/2 to a value which is much larger than U/2 and depends on the ratio of the resistors $R_1/R_2$ and when the output voltage $V_i$ decreases from U to 0, the input voltage $V_1$ falls suddenly from the value U/2 to a value much lower than U/2 which also depends on the ratio of the resistors $R_1/R_2$.

The modulator described is of the type described in the above-mentioned French Patent Application No. 7908725. It can be shown that the output signal $V_S$ of this modulator has a symmetrical triangular shape, an average value U/2 and a frequency defined by the expression $$f = \frac{1}{4 \frac{R_1}{R_2} \cdot R \cdot C}$$

in which the parameters $R_1$, $R_2$, R and C defined already in the foregoing occur.

The present invention provides more specifically the means for realizing the resistor network 15, which has a variable resistance value R and is switchable to realize the above-defined conditions.

This network 15 is formed by two parallel branches connected between the terminals 16 and 17. One branch comprises the series arrangement of the resistors 22 and 23 and the other branch the series arrangement of the resistors 24 and 25. The resistors 22 and 24 connected to the terminal 17 of the network and denoted first resistors of the two branches are short-circuitable with the aid of a pair of first analog switches 26 and 27, which are together controlled by the data signal D applied to the terminal 2 of the modulator. The second resistor 23 is connected to the terminal 16 of the network through a second analog switch 28, which is controlled by a logic control signal A appearing at a control terminal 29 of the modulator and having for its object to select either the two low frequencies or the two high frequencies. Finally, it is possible to arrange in parallel with the other, second resistor 25 connected directly to the terminal 16 of the network, a third resistor 30 with the aid of a third analog switch 31, which is controlled by a logic control signal B appearing at a control terminal 32 of the modulator and having for its object, for example, to replace one of the high frequencies by another, as recommended by the CCITT. Replacing the resistor 30 by the resistor 33 renders it possible to obtain another high frequency under the control of the signal B.

The Table of FIG. 2 shows, as a function of the data signal D and the logic control signals A and B, the configuration of the resistor network 15 and the corresponding frequencies obtainable in the CCITT standard and the US standard. It is assumed that the analog switches are closed or open according as their control signals have the value "1" or "0".

Adjusting in the factory the frequencies of a standard is effected in the sequence of frequencies from high to low in the Table. The first line of this Table shows that adjusting the resistor 25 renders it possible to obtain the frequency of 450 Hz in the CCITT standard (or the frequency of 457 Hz in the US standard). The second line shows that adjusting the resistor 24 renders it possible to obtain the frequency of 390 Hz of the CCITT standard (or the frequency of 387 Hz of the US standard). Similarly, as shown by the configurations in the third, the fourth and the fifth lines of the table, the consecutive adjustments of the resistors 23, 22 and 30 (or 33) render it possible to obtain successively the frequencies of 2100, 1300, 1700 Hz of the CCITT standard (or the frequencies of 2200, 1200, 900 Hz of the US standard). A variant of the frequency adjusting procedure consists in adjusting the first frequency of 450 Hz (or 487 Hz) by means of the resistor 18 of the bistable trigger while using a fixed resistor 25, the other frequencies being thereafter adjusted as described hereinbefore.

It will be clear that with this adjustment procedure each frequency adjustment has no influence whatsoever on the previously adjusted frequencies and is not influenced by the imperfections of previous adjustments. The analog switches utilized for establishing the network 15 in its different configurations show parasitic resistances having typical values such as 300 Ohm when these switches are closed and $10^9$ Ohm when these switches are opened. The resistances of the network 15 are chosen in a range of values such that the resistance R of this network is substantially not influenced by these parasitic resistances. When the resistors of the network 15 are realised by a conductive layer deposited on an insulating wafer they can be adjusted with great precision by means of a laser.

With an adjustment effected in the factory as described above, it is consequently possible to employ the modulator 1 for a predetermined standard with precisely defined frequencies. It is thereafter possible, at the site where the modem is installed, to adapt the modulator to the transmission of data on low frequencies or on high frequencies by choosing the value of the logic signal A applied to the terminal 29 of the modulator. The logic signal B applied to the terminal 32 provides the possibility of an additional frequency.

The charging current of the integrating circuit comprising the resistor network 15 and the capacitor 14 is supplied from the output of the inverter 20. To ensure that this charging current is well calibrated, the inverter 20 must have a low output impedance compared with the minimum resistance of the network 15, a good temperature stability and must switch stable voltages. To establish these conditions it is advantageous for the inverter 20 to be entirely realized by means of analog switches, which are supplied with the zero potential from ground or the supply voltage U and arranged as shown in FIG. 1.

Inverter circuit 20 comprises analog switches 35 and 36, whose input terminals receive the 0 V ground potential and the voltage U, respectively and whose output terminals are interconnected through low-value protection resistors 37 and 38 to provide the output of the inverter circuit 20. These two switches 35 and 36 are controlled in a complementary way from a voltage $V_e$ produced by the comparator 19. For that purpose the voltage $V_e$ directly controls switch 35 and a further analog switch 39. The latter has its output terminal connected to ground and its input terminal to the supply terminal of voltage U through a protection resistor 40. The voltage on this input terminal is used to control the switch 36. It can easily be seen that with analog switches which are open or closed according as their control voltage is 0 or U, the output voltage $V_i$ of inverter circuit 20 assumes the values 0 or U, according as its input voltage $V_e$ assumes the values U or 0. The circuit 20 thus acts as a logic inverter.

No other switching besides that effected in the modulator is necessary to adapt the transmission circuit according to the invention to a modem transmitting by means of the low frequencies or to a modem transmitting by means of the high frequencies. Actually, the filter circuit 5 of the transmission circuit is suitable, without adaptation, for these two modems. This filter circuit 5 has in essence two functions: a first function is to limit the frequency band of the signal transmitted towards the remote receiver in order to match it to the width of the transmission channel. This function may be performed by a low-pass filter attenuating outside the telephone band. A second function of the filter circuit 5 is to attenuate the frequency components of the signal supplied by the modulator 1 and located in the band of the local receiving circuit 12. To perform this second function, a modification is generally effected by changing the filter function of the filter circuit 5 when a change is made from a modem transmitting by means of low frequencies to a modem transmitting by means of high frequencies. Actually, for the example, of the frequencies of the CCITT standard, when a local modem employs the low frequencies of 390 and 450 Hz for the transmission, its receiving circuit must receive in a band roughly covering the high frequencies of 1300 and 2100 Hz and extending, for example, from 1000 Hz to 2400 Hz. As harmonics of the transmitted, low frequencies fall within this receiving band and may form a disturbing signal for the receiving circuit 12, the filter circuit 5 is, in known solutions, changed to a configuration for attenuating these disturbing harmonics. Conversely, when the local modem employs the high frequencies of 1300 and 2100 Hz for the transmission, the filter circuit 5 is changed to an other configuration for passing all the components in the receiving band (100 Hz to 2400 Hz) of the remote modem.

The present invention provides another solution permitting to avoid this switching action, by providing the filter circuit 5 with a circuit for suppressing the harmonics of the low frequencies which fall within the receiving band of the high-frequency receiving circuit 12. With the modulator of the transmission circuit according to the invention, which produces triangular signals having only odd harmonics of amplitude $A/k^2$ (k being the order of the harmonics), only odd harmonics must be suppressed. In the example of the frequencies of the CCITT standard, the third and fifth harmonics of the low frequencies of 390 and 450 Hz which fall within the receiving band of approximately 1000 to 2400 Hz of the receiving circuit must be suppressed.

It can be shown, by using Fourier analysis, that certain odd harmonics of a triangular signal may be completely suppressed by modifying the shape of this triangular signal by replacing it by a signal having a suitable polygonal shape, constituting an approximation of a sinusoidal curve. To suppress, for example, the third and fifth harmonics it is sufficient to act as illustrated by FIG. 3.

Figure 3:
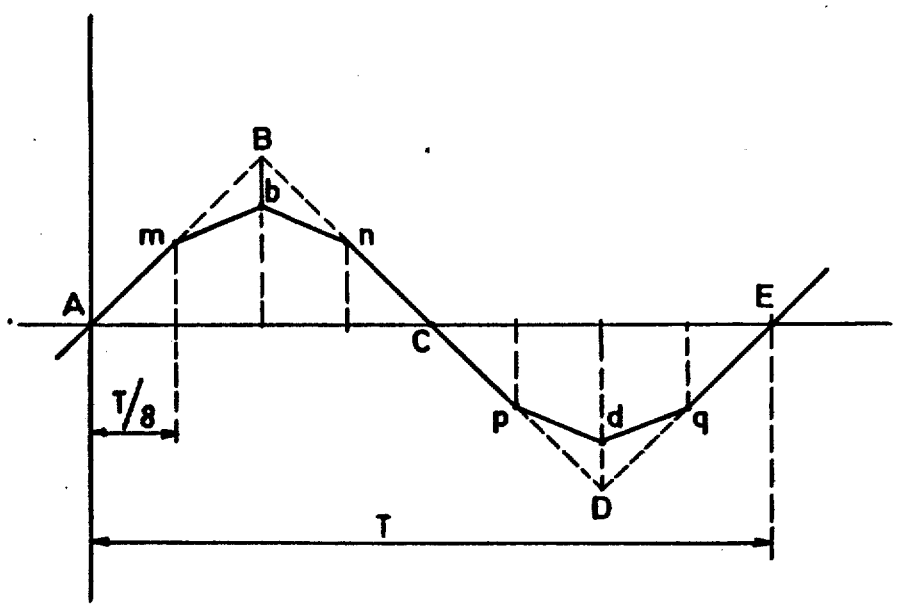
FIG. 3 is a diagram illustrating the function of a wave-shaping circuit having diodes for suppressing the unwanted harmonics.

In this FIG. 3, the initial triangular signal varying around the average voltage U/2 is shown during one period T by the line A B C D E. To suppress the third and fifth harmonics, it can be shown that it is sufficient to modify the initial signal in such a way that during one period it assumes the shape represented by the line AmbnCpdqE defined for the points which are separated by a time interval T/8. FIG. 3 shows that between the points A and m the modified signal is identical to the initial signal, the variation having the slope P. Between the points m and b, the modified signal is different from the initial signal and varies with a slope $P(\sqrt{2}-1)$. Between the points b and n the slope of the modified signal is $-P(\sqrt{2}-1)$ and between the points n and C its slope is the same as the slope $-P$ of the initial signal. Between the points C and E the modified signal varies with a slope having opposite signs compared to those appearing between the points A and C. With such a modified signal the amplitude of the harmonics other than the third and the fifth harmonics is not changed.

A filter circuit 5 which utilizes the procedure illustrated by FIG. 3, can be realized in accordance with the circuit diagram shown in FIG. 1. In this circuit the output signal $V_S$ of the modulator is applied to an amplifier 41 to be brought to a level suitable for a harmonics suppressing circuit 51. The latter is a wave-shaping circuit having diodes and comprises a resistor 42 of value r connected at one end to the output of the amplifier 41 and at its other end to the opposite electrodes of two diodes 43 and 44. The other electrode of diode 43 is connected to the supply terminal of voltage U through a resistor 45 of value $k_1r$; the other electrode of diode 44 is connected to the supply terminal at ground potential through a resistor 46 of value $k_1r$. Finally, the electrodes of the diodes 43 and 44, connected to the resistors 45 and 46, are in addition interconnected through a resistor 47 of value $k_2r$. The output voltage of this diode wave-shaping circuit is tapped off at a terminal 48 interconnecting resistor 42 and diodes 43, 44.

In this diode wave-shaping circuit the diodes 43 and 44 are conductive or non-conductive depending on the voltage applied to the input terminal 4 of the wave-shaping circuit and on the values of the resistors 42, 45, 46 and 47. When none of the diodes is conductive, the output voltage of the wave-shaping circuit varies as its input voltage; when either the one or the other of the diodes 43 and 44 is conductive, the output voltage of the wave-shaping circuit varies in accordance with a positive or negative slope defined by the parameters $k_1$ and $k_2$. By means of conventional calculations it is possible to determine the parameters $k_1$ and $k_2$ permitting of obtaining at the output a voltage which varies as shown in FIG. 3.

The output signal of the diode wave-shaping circuit 51, thus being freed from the unwanted third and fifth unwanted harmonics, is applied to a low-pass filter 49 which adapts the signal transmitted towards the remote receiver to the transmission channel. This low-pass filter may be constructed in a conventional manner to attenuate the frequencies above approximately 3500 Hz. This function may optionally be completed with the aid of a capacitor 50, which is shown by means of dotted lines and is connected between the output of the wave-shaping circuit 41 and ground and which, together with the resistor 42, also effects a low-pass filtering.

When the modulator 1 of the modem is established for transmitting low frequencies, the third and fifth harmonics unwanted for the local receiving circuit 12 are then automatically suppressed by the filter circuit of the above construction. But in addition thereto, when the modulator is established for transmitting high frequencies (1300 and 2100 Hz for example), the third and fifth harmonics of these high frequencies are also suppressed. These harmonics which are not disturbing in this case for the local receiving circuit 12, are however, located outside the band of the transmission channel and their automatic suppression makes it possible to construct the lowpass filter 49 in a simpler way.

In the event of other frequency standards, for which other unwanted harmonics for the local receiving circuits must be suppressed, it is possible to use a more complicated diode wave-shaping circuit which converts the triangular signal into a signal of a polygonal shape, different from the shape of FIG. 3 and not comprising these other unwanted harmonics.

The transmission circuit according to the invention described above is perfectly suitable for performing, the loop test 3 of the modem prescribed by the CCITT. To perform this test, the transmission circuit is looped to the receiving circuit 12 of the modem, by, for example, unbalancing the hybrid coupler 8. To test the modem, the modulator 1 is controlled such that in response to the test signal it transmits the low frequencies or the high frequencies or any other possible frequency located in the band of the receiving circuit 12. In contrast with the test system described in detail in the above-mentioned French Patent Application No. 8013867, the filter circuit 5 need not to be modified to effect testing of the modem.

What is claimed is:

1. An improved transmission circuit for a modem which also includes a receiving circuit, such transmission circuit comprising a modulator and a filter circuit and being adapted to transmit binary data signals over a transmission path by frequency shift modulation of a pair of carrier waves, the frequencies of such carrier waves being selectable between a pair of specified low frequencies and a pair of specified high frequencies, such improvement being characterized in that:

said modulator comprises an integrating circuit, a bistable trigger circuit and a resistor network, the output of the trigger circuit being connected to the input of the integrating circuit through the resistor network so as to form a regenerative feedback loop which causes the integrating circuit to produce a triangular carrier wave at a frequency determined by the resistance of the resistor network;

said resistor network comprises first and second resistive branches connected in parallel between the output of the trigger circuit and the input of the integrating circuit, each of said branches comprising first and second resistors connected in series; first and second analog switches respectively shunting the first resistor in each of said branches, said first and second switches both being controlled by the binary data signal to be transmitted to simultaneously short-circuit the first resistor in each of said branches in response to one value of such signal; and a third analog switch in series with the second resistor in the second of said branches, said third switch being controlled by a binary control signal applied thereto; whereby the resistance of said resistor network may be set to any of four distinct values determined by the logical combinations of said binary data signal and said binary control signal, thereby causing said integrating circuit to selectably produce carrier waves at said pair of specified low frequencies or at said pair of specified high frequencies;

and said filter circuit is connected to the output of said integrating circuit to receive the triangular carrier wave produced thereby, said filter circuit being adapted to modify the waveform of such triangular wave so as to suppress odd harmonics thereof which are within the frequency band of the modem receiving circuit.

2. A transmission circuit as claimed in claim 1, characterized in that the filter circuit modifies the waveform of the triangular carrier wave produced by the integrating circuit so as to obtain a waveform having a polygonal shape which does not contain odd harmonics of the frequency of such carrier wave.

3. A transmission circuit as claimed in claim 1, wherein the specified low frequencies of the carrier wave are approximately 390 and 450 Hz and the specified high frequencies thereof are approximately 1300, 1700 and 2100 Hz, and the filter circuit suppresses the third and fifth harmonics of the said low frequencies.

4. A transmission circuit as claimed in claim 1, wherein an auxiliary resistor and a third switch in series therewith are connected in shunt with the second resistor in the first of said resistive branches, said third switch being controlled by an auxiliary binary control signal applied thereto; whereby the resistance of said resistor network may be set to a fifth distinct value which causes said integrating circuit to selectably produce carrier waves an alternative pair of specified frequencies.

5. A transmission circuit as claimed in claim 1, in which said bistable trigger circuit in said modulator comprises a comparator and a logic inverter circuit, the output of the comparator being connected to the input of the inverter circuit, the comparator having a first input which receives a fixed supply voltage and a second input which is connected through a resistor to the output of the inverter circuit, the output of the inverter circuit constituting the output of the bistable trigger circuit; and in which the inverter circuit comprises two analog switches the input terminals of which are respectively connected to opposite terminals of the supply voltage and the output terminals of which are interconnected to provide the output terminal of the inverter circuit, said two switches being controlled in complementary manner by the output voltage of the comparator by means of a third analog switch.

* * * * *

UNITED STATES PATENT AND TRADEMARK OFFICE
CERTIFICATE OF CORRECTION

PATENT NO.  : 4,573,165

DATED       : Feb. 25, 1986

INVENTOR(S) : Robert Boudault

It is certified that error appears in the above-identified patent and that said Letters Patent is hereby corrected as shown below:

The sheets of Drawing consisting of Figures 2 and 3 should be included as per attached sheets.

Signed and Sealed this

Seventh Day of October, 1986

[SEAL]

*Attest:*

DONALD J. QUIGG

*Attesting Officer*  *Commissioner of Patents and Trademarks*

| D | A | B | R  (15) | CCITT | US |
|---|---|---|---|---|---|
| 1 | 0 | 0 | —[25]— | 450 Hz | 487 Hz |
| 0 | 0 | 0 | —[25]—[24]— | 390 | 387 |
| 1 | 1 | 0 | [25] ∥ [23] | 2100 | 2200 |
| 0 | 1 | 0 | [25]-[24] ∥ [23]-[22] | 1300 | 1200 |
| 1 | 0 | 1 | [25] ∥ [30(33)] | 1700 | 900 |

FIG. 2